United States Patent

Ramsey

[15] 3,676,949

[45] July 18, 1972

[54] INSECTICIDE DISTRIBUTION SYSTEM

[72] Inventor: Roy L. Ramsey, 3200 N. 14th St., Ponca City, Okla. 74601

[22] Filed: March 19, 1969

[21] Appl. No.: 817,228

[52] U.S. Cl. ..........................................................43/124
[51] Int. Cl. ...................................A01m 1/20, A01m 1/24
[58] Field of Search....................................................43/124

[56] References Cited

UNITED STATES PATENTS

| | | | |
|---|---|---|---|
| 887,275 | 5/1908 | Rumpel | 43/124 X |
| 1,795,488 | 3/1931 | Hill | 43/124 |
| 2,862,765 | 12/1958 | Wing | 43/124 X |
| 3,330,062 | 7/1967 | Carter | 43/124 |

Primary Examiner—Warner H. Camp
Attorney—William J. Miller

[57] ABSTRACT

An insecticide distribution system and method consisting essentially of a pipe system having an inlet and an outlet and a plurality of nozzles along the pipe. In use, the pipe system is filled with insecticide at the inlet until insecticide is present at the outlet. The outlet is then closed off and the system pressured until the nozzles open at the preset pressure at which time the area near the nozzles will be sprayed with insecticide.

11 Claims, 6 Drawing Figures

PATENTED JUL 18 1972

INVENTOR.
Roy L. Ramsey
BY
William J. Miller

INVENTOR.
Roy L. Ramsey
BY

INSECTICIDE DISTRIBUTION SYSTEM

PRIOR ART

Built in insecticide systems have all dealt with means for treating the foundations of homes to rid the foundation of termites and other insects. None of the prior systems have tried to rid the entire house of insects, including the foundation. This invention uses a distribution system that is piped through the joists, the rafters and the partitions under the built-ins in the kitchen and all other inaccessable locations. Along the pipe distribution system is located a plurality of nozzles which are set to operate at a preset pressure. None of the prior art systems pressure the pipes prior to the operation of the nozzles. Since the distribution system of this invention has the pipes at different levels and locations, the only way to get total and complete distribution of insecticide is to insure that each nozzle will operate at about the same time.

BRIEF DESCRIPTION OF THE INVENTION

This invention relates to a prepressured insecticide distribution system useful for ridding the entire house or building of insects. The preferred system comprises a complete loop pipe system having an input and a closable output. Along the pipe system is mounted a plurality of preset pressure responsive nozzles, each positioned to spray a desired portion of the interior of the house or building. The system is preferably installed during the construction of the building so that every space that can breed insects can be sprayed. The system is not so limited however, that it cannot be used effectively in a home that has already been constructed.

Another aspect of the invention contemplates using sections of prepressured pipes which are controlled by one pressure valve. The valve can be located at any convenient location for modification or service of the valve.

DETAILED DESCRIPTION OF THE INVENTION

Figure 1:
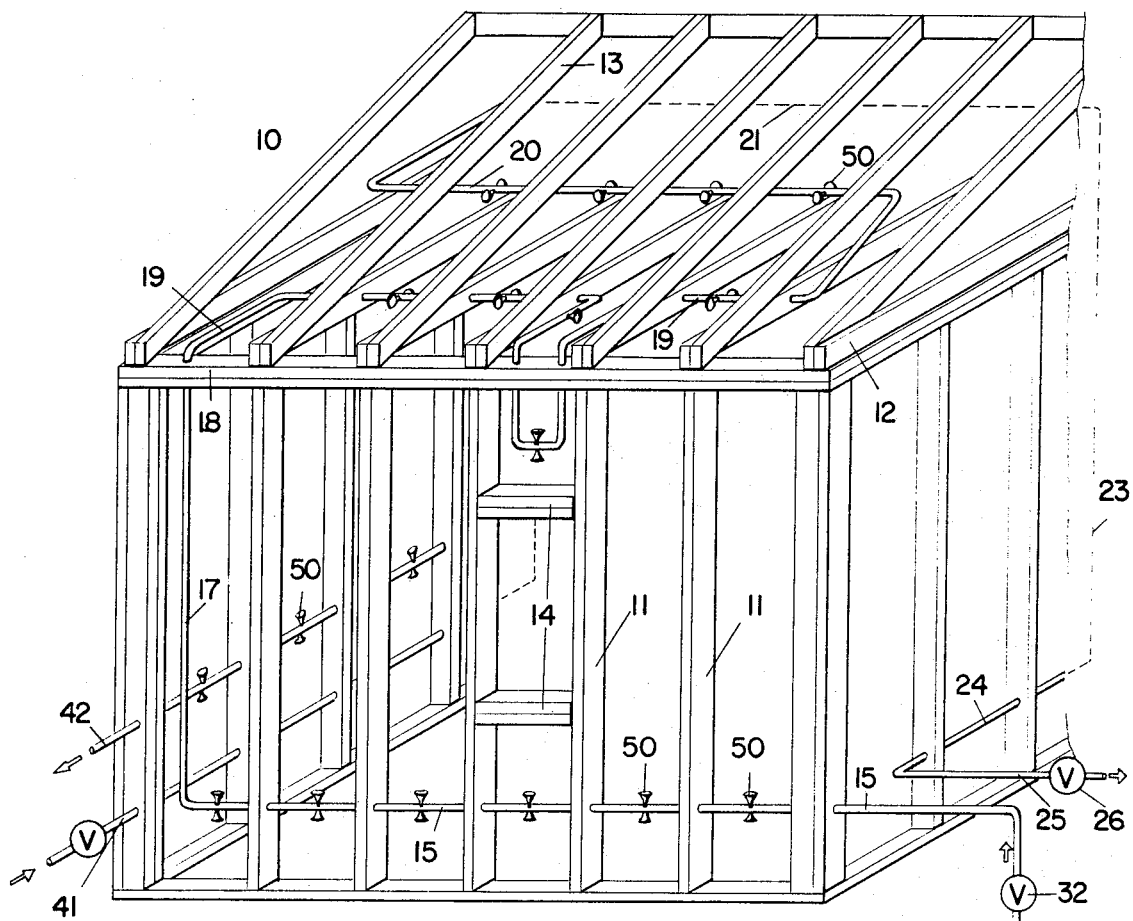
FIG. 1 is a view of a house under construction showing the insecticide distribution system as installed.

Referring to all of the drawings but in particular to FIG. 1, a house generally referred to by numeral 10 is shown, comprised of a plurality of studs 11, ceiling joists 12, rafters 13, and window lintels 14 for example. In the partially constructed house, the insecticide system is installed by drilling holes through the studs 11, and running therethrough a pipe 15. The attic or second story of the house is connected to the system by connecting a pipe 17 to pipe 15, through the plate 18 to the attic. A plurality of holes are then drilled through the ceiling joists 12 and a pipe 19 is run therethrough. If the attic is not to be floored, then pipe 19 need only be laid on top of the ceiling joists 12. Additional pipes 20 and 21 may, of course, be added to insure complete coverage of the attic. A return line 23, 24, and 25 convey the insecticide back to the location of entry. A valve 26 is connected to the end of the return line on pipe 25. An insecticide tank or storage means 30 is connected through a pipe 31 to a valve 32 which is in turn connected to pipe 15. Tank 30 can either be permanently installed or can be portable in which case pipe 31 can be disconnected.

As many systems as necessary can be installed for either convenience or necessity such as for example pipes 41 and 42. Once the system is installed, nozzles 50 are mounted in place by any well known method such as drilling and tapping. It is obvious, of course, that separate nozzle mounting pipes could be installed at the time pipe 15 is installed.

Figure 2:
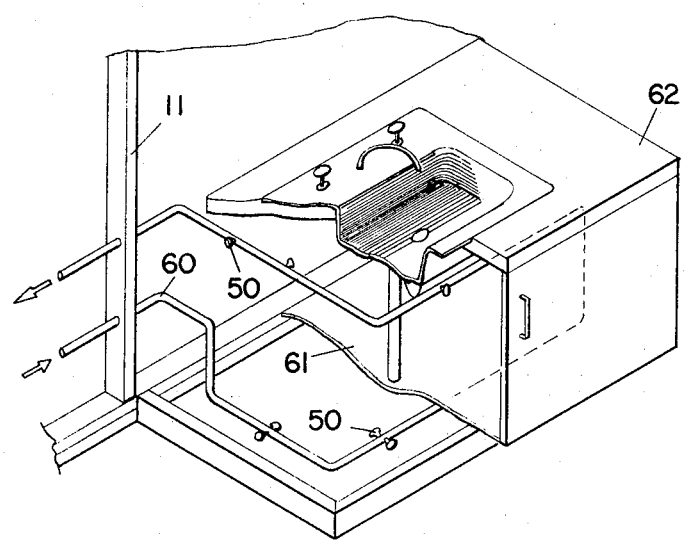
FIG. 2 is a perspective view of a kitchen area shown in partial section, with the insecticide distribution system installed in the preferred manner.

Referring to FIG. 2, an installation for a kitchen sink area is illustrated wherein a pipe 60 enters through stud 11 and under the sink cabinet floor 61, and returns under the counter top 62 and back through the stud 11. Nozzles are likewise mounted on this pipe.

Figure 6:
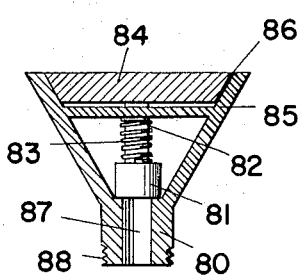

FIG. 6 shows a cross sectional view of a valve suitable for use with this invention. The valve comprises a mounting pipe 80 connected to a cone on one end and having threads 88 on the other. A shaft 82 is connected to a dispersion head 84 on one end and to a valve sealing member 81 on the other. A spring 83 mounted around shaft 82 biases sealing member 81 over a inlet 87 to seal the inlet against the entry of insecticide until a predetermined amount of pressure is reached.

OPERATION

Figure 5:
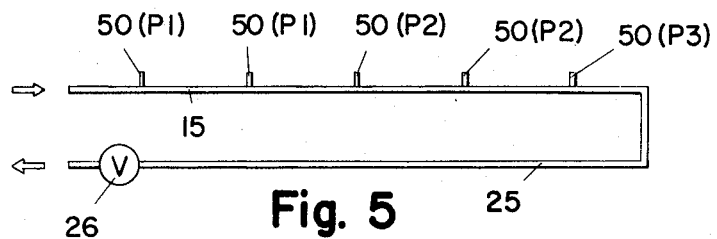
FIG. 5 is a schematic of the preferred method for connecting the valves and nozzles as a unit, and, FIG. 6 is a cross sectional view of a pressure operated valve.

Referring to FIGS. 1, 2, and 5, tank 30 (if portable) is connected to valve 32 and valve 32 is then opened. Valve 26 if closed should also be opened. Insecticide will flow from tank 30 by pressurizing the tank. The fluid will then flow through valve 32, pipe 15, up pipe 17 to pipe 19, pipe 20, 23, 24, and 25 to valve 26. Once the insecticide begins to come from the valve 26 the pipes are full of fluid and the valve can be shut off. Pressure will then begin to build up in the pipes. Each of the valves will, however, prohibit insecticide from escaping until the pressure has built up to the release point of each valve. At that time, the valve will unseat and the insecticide will spray around the area near the valve. For a high pressure system the nozzles can spray a large area. The shape of the head of the nozzle should be suitable for the area to be sprayed. The attic for example, can use a nozzle that will generate a very fine mist so that the entire area can be covered by a few as possible of them. In FIG. 5 nozzles 50 are shown having several different pressures $P_1$, $P_2$, and $P_3$. The variations in pressure would be used when the nozzles were at different heights such as on different floors. Since it should take more pressure to lift the fluid to the second floor, the pressure $P_1$ on floor one for example, should be set higher than $P_2$ or $P_3$.

Figure 3:
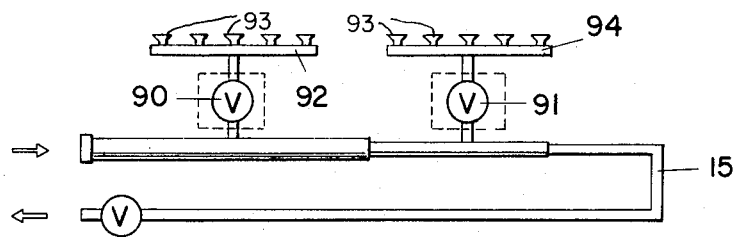
FIG. 3 shows a plurality of nozzles operated at one pressure valve.
Figure 4:
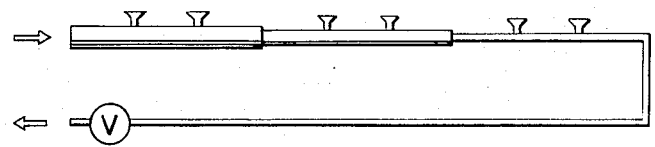
FIG. 4 illustrates one manner of compensating for pressure drop.

Another way to assist in adjusting for the differential in pressure is to adjust the diameter of the pipes as shown in FIGS. 3 or 4.

FIG. 3 includes another embodiment of this invention wherein a pipe 15 is connected to a main valve 90 or 91. A pipe 92 connects valve 90 to a plurality of jets 93. Likewise pipe 94 connects from valve 91 to jets 93. There may be as many sets of valves as necessary to properly cover the house or building. In operation fluid or gas entering pipe 15 will be blocked by valve 90 until a predetermined pressure setting of valve 90 or 91 is reached at which time the valves will open and the fluid will be conveyed to the jets 93.

It is obvious that various types of nozzles can be used depending on the need such as a fan, periphery fog, impinging fog, or swirling fog, or a jet type nozzle. While the drawings show the system in a few locations in a house, the system can be installed where ever it may be necessary to protect from insects. It is also obvious that other materials than liquids can be used such as liquid mixed with air, or powder mixed with air. A gas could also be used. Rodent poison or repellant can also be used instead of insecticides.

Once the material has been completely distributed throughout the house, the lines must be cleaned out to insure proper operation of the nozzles in the future For this purpose, the valve 32 is connected to a source of air or a combination of air and solvent. The air is then forced through all of the jets and nozzles to remove all traces of the insecticide.

The term insecticide is used throughout this specification to include the said repellants and poisons above mentioned.

The preferred embodiment of this invention has been described in the above specification. It is obvious that changes and modifications can be made and still be within the spirit and scope of the invention.

What I claim is:

1. In combination with a building, a fluid material distributing system comprising a pipe means disposed in said building, nozzle means, said nozzle means having one end connected to said pipe and the remaining end formed to create a spray when said fluid material passes therethrough, means for preventing escape of said fluid material from within said pipe and out of said nozzle means below a predetermined fluid pressure but responsive to fluid pressure above said predetermined amount to permit said fluid to escape therefrom, an inlet to said pipe means, an outlet to said pipe means, and valve means for selectively opening or closing said outlet means, whereby when said valve means is open, said fluid material entering said inlet means can fill said pipe means and when said valve means is closed, said fluid means can be pressured to above said predetermined pressure causing said fluid material to spray from said nozzle means when said predetermined pressure is realized.

2. A device as described in claim 1 wherein said means for preventing escape of fluid material from within said pipe and out of said nozzle means comprises a pressure operated valve built into said nozzle means.

3. A device as described in claim 1 wherein said means for preventing escape of said fluid material from within said pipe means and out of said nozzle means comprises a pressure operated valve inserted between the said pipe means and said nozzle means.

4. A device as described in claim 3 wherein said nozzle means comprises a plurality of jets.

5. A method of distributing insecticide comprising:
   a. filling a pipe system completely with said insecticide,
   b. increasing the pressure in said pipe system until a predetermined pressure is reached,
   c. releasing said insecticide at said predetermined pressure into an area to be treated,
   d. releasing said pressure to pipe system and opening said pipe system to drain out all of said insecticide in said pipe system, and,
   e. repressuring said pipe system with air above the predetermined pressure releasing air through said system to clean said system.

6. A system as described in claim 1 wherein said pipe means are run through the wall joists of said building.

7. A system as described in claim 1 wherein said nozzle means comprises a pipe having a cone on one end and mounting threads on the other end, said means for preventing escape of fluid material below a predetermined fluid pressure comprises a valve seat over said pipe means mounted in said cone, and a spring biasing said valve seat over said pipe means so that the opening is closed until a predetermined pressure is reached.

8. A system as described in claim 1 wherein said nozzle means is a fog nozzle.

9. A method of distributing insecticide as described in claim 5 in which said insecticide is composed of powder mixed with air.

10. A system as described in claim 1 wherein said fluid material is a rodent poison.

11. A system as described in claim 1 wherein said fluid material is a repellant.

* * * * *